United States Patent
Storro

(10) Patent No.: US 11,673,667 B2
(45) Date of Patent: Jun. 13, 2023

(54) DYNAMIC SHARING OF AIRCRAFT'S SUSPENDED LOADS

(71) Applicant: Travis G. Storro, Sagle, ID (US)

(72) Inventor: Travis G. Storro, Sagle, ID (US)

(*) Notice: Subject to any disclaimer, the term of this patent is extended or adjusted under 35 U.S.C. 154(b) by 0 days.

(21) Appl. No.: 17/497,909

(22) Filed: Oct. 9, 2021

(65) Prior Publication Data

US 2023/0110406 A1    Apr. 13, 2023

(51) Int. Cl.
  *B64D 1/22*   (2006.01)
  *B64C 1/06*   (2006.01)
  *B64C 27/04*  (2006.01)

(52) U.S. Cl.
  CPC .............. *B64D 1/22* (2013.01); *B64C 1/061* (2013.01); *B64C 27/04* (2013.01)

(58) Field of Classification Search
  CPC ....... B64D 1/22; B64C 1/0614; E04H 9/0215; E04H 9/0235; E04H 9/0237
  USPC ............ 269/266; 254/6 C, 10 C, 89 R, 93 L; 294/81.3, 87.5, 67.5
  See application file for complete search history.

(56) References Cited

U.S. PATENT DOCUMENTS

| | | | |
|---|---|---|---|
| 3,513,987 A * | 5/1970 | Seyff .......................... | B66C 1/10 |
| | | | 212/282 |
| 4,479,621 A | 10/1984 | Bergholz | |
| 5,377,556 A | 1/1995 | Byrnes | |
| 5,417,304 A | 5/1995 | Kurtgis | |
| 6,019,316 A | 2/2000 | Sarlin et al. | |
| 6,604,712 B2 | 8/2003 | Kurtgis | |
| 6,990,928 B2 | 1/2006 | Kurtgis | |
| 8,074,928 B2 | 12/2011 | Haack et al. | |
| 9,114,876 B1 | 8/2015 | Cockell, II | |
| 9,845,154 B2 | 12/2017 | Behrens et al. | |

(Continued)

FOREIGN PATENT DOCUMENTS

| CN | 112081387 A | * 12/2020 | ........... E04G 21/121 |
|---|---|---|---|
| DE | 102006019220 A1 | * 10/2007 | ............... B64D 1/22 |

(Continued)

OTHER PUBLICATIONS

Sikorsky; UH-60A Blackhawk; Cabin Interior with Troop Seats; https://b-domke.de/AviationImages/Blackhawk/10388.html; one page, dated 2006.

*Primary Examiner* — Joshua J Michener
*Assistant Examiner* — Ryan Andrew Yankey
(74) *Attorney, Agent, or Firm* — bobharter.com; Robert J. Harter

(57) ABSTRACT

To reduce strain and mitigate fatigue in an aircraft's airframe, some example dynamic load-sharing systems provide the aircraft with multiple tension devices that share the weight of a load hanging from the aircraft. In some examples, the tension devices are installed in the aircraft's cabin space to protect the surrounding airframe by transmitting a portion of the load's weight directly from the floor to the ceiling of the aircraft. In some examples, the portion of the weight transmitted by the tension devices is proportional to the load's total weight. In some examples, the tension devices are piston/cylinder devices that are interconnected by a manifold to distribute the load equally among the tension devices. Some examples of dynamic load-sharing system include a pressure relief valve and/or an accumulator that limits the maximum load applied to each tension device.

14 Claims, 16 Drawing Sheets

(56) References Cited

U.S. PATENT DOCUMENTS

| | | |
|---|---|---|
| 10,046,845 B2 | 8/2018 | Dazet et al. |
| 10,384,770 B2 | 8/2019 | Bottasso et al. |
| 10,507,920 B2 | 12/2019 | Waltner et al. |
| 10,717,530 B2 | 7/2020 | Winfree et al. |
| 2009/0236472 A1* | 9/2009 | Wood ........................ B64C 1/18 244/119 |
| 2010/0001134 A1 | 1/2010 | Braeutigam et al. |
| 2013/0092793 A1* | 4/2013 | Braeutigam ............. B64C 1/18 244/131 |
| 2013/0213288 A1 | 8/2013 | Hall |
| 2015/0267397 A1* | 9/2015 | Benthien ................. F16C 11/04 52/645 |

FOREIGN PATENT DOCUMENTS

| | | | |
|---|---|---|---|
| EP | 3480110 A1 * | 5/2019 | |
| FR | 3122641 A1 * | 11/2022 | ............... B64C 1/18 |
| GB | 2169256 A * | 7/1986 | ............... B64C 1/18 |

\* cited by examiner

DYNAMIC SHARING OF AIRCRAFT'S SUSPENDED LOADS

FIELD OF THE DISCLOSURE

This patent generally pertains to carrying loads suspended from aircraft and more specifically to means for dynamically apportioning the stress of the load to mitigate airframe fatigue.

BACKGROUND

Some aircraft (e.g., helicopters, airplanes and dirigibles) are used for carrying loads suspended from underneath or behind the aircraft. A load line typically connects the load to a hook attached to the underside or tail of the aircraft. The weight carried by the hook is usually transmitted to the aircraft's airframe. Some example loads include heavy equipment for construction and water buckets for aerial firefighting.

DETAILED DESCRIPTION

Figure 1:
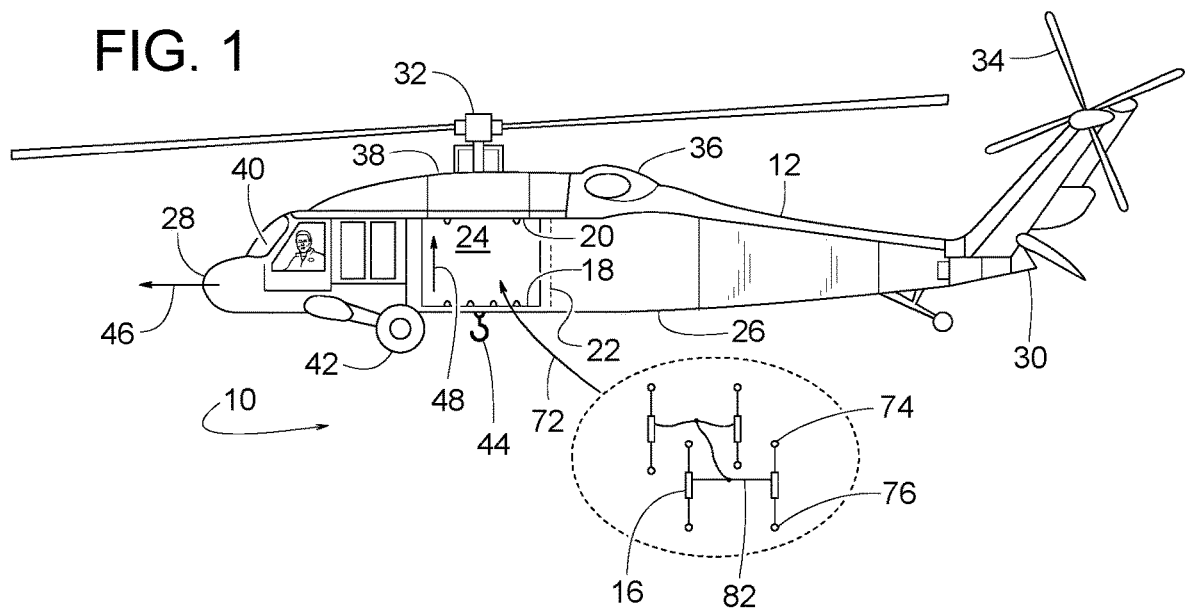
FIG. 1 is a side view of an example aircraft in the process of receiving an example dynamic load-sharing system constructed in accordance with the teachings disclosed herein.

FIGS. 1-21 pertain to a dynamic load-sharing system 10 (e.g., dynamic load-sharing systems 10a, 10b, 10c, 10d, 10e, 10f and 10g) for protecting the structural integrity of an aircraft 12 carrying a suspended load 14. Some examples of load-sharing system 10 include at least one tension device 16 that transfers a portion of the load's weight directly from a floor 18 to a ceiling 20 of aircraft 12. The aircraft's airframe 22 conveys the rest of the load's weight in a more indirect route around the aircraft's cabin space 24. By sharing the load, tension device 16 helps mitigate strain and fatigue in airframe 22.

The term, "aircraft" refers to any flying machine. Some examples of aircraft 12 include single and multi rotor helicopters, airplanes, and dirigibles. Some examples of helicopters include Eurcopter/Airbus (e.g., Puma and Super Puma), Sikorsky (e.g., Black Hawk, Sea Stallion, and Super Stallion), and Boeing (e.g., Chinook and Vertol).

In the illustrated examples, aircraft 12 is a helicopter comprising a fuselage 26 with airframe 22, cabin space 24 between floor 18 and ceiling 20, a nose 28, a tail 30, a main rotor 32, a tail rotor 34, an engine 36, a transmission 38 coupling engine 36 to main rotor 32, a cockpit 40, landing gear 42, and a hook 44 at floor 18 for carrying load 14. Aircraft 12 defines a forward direction 46 pointing from tail 30 to nose 28. Aircraft 12 defines an upward direction 48 pointing from floor 18 to ceiling 20. In the illustrated examples, the helicopter's translating side door is open to show the interior of cabin space 24.

In some examples, the aircraft's airframe 22 includes a floor beam 22a to which hook 44 is connected, a transmission-supporting beam 22b at ceiling 20 to support the weight of transmission 38, and a sidewall beam 22c extending between floor beam 22a and transmission-supporting beam 22b. In some examples, airframe 22 consists of lightweight 7075 aluminum alloy, which can be particularly susceptible to fatigue cracking.

The term, "tension device" refers to any elongate member for transmitting a tensile force along its length, wherein the elongate member comprises multiple components and lengthens in response to the magnitude of the tensile force. Tension device 16 is schematically illustrated broadly in FIGS. 1-6 and 13.

In some examples, as shown in FIGS. 7, 11, 12 and 14-17; tension device 16 includes a driven piston/cylinder device 50. The term, "piston/cylinder device" refers to any apparatus comprising a piston movable within a cylinder. In some examples, driven piston/cylinder device 50 comprises a piston rod 52 connected to a piston 54 that is movable within a cylinder 56 to vary the volume of a rod-end chamber 58 and/or a cap-end chamber 60 within cylinder 56. Rod-end chamber 58 is at a rod-end 62 of cylinder 56. Cap-end chamber 60 is at a cap-end 64 of cylinder 56. Some examples of driven piston/cylinder device 50 include a rod-end port 66 and/or a cap-end port 68, which are in fluid communication with rod-end chamber 58 and cap-end chamber 60, respectively. In some examples, ports 66 or 68 might simply serve as a vent to atmosphere or to a tank 70.

In FIG. 1, an arrow 72 represents installing at least one tension device 16 at least partially within cabin space 24 such that tension device 16 couples floor 18 to ceiling 20. In some examples, dynamic load-sharing system 10 comprises a plurality of tension devices 16, e.g., four tension devices 16. In some examples, each tension device 16 of the plurality of tension devices 16 extends vertically from floor 18 to ceiling 20. Each tension device 16 includes an upper point 74 and a lower point 76. Each upper point 74 is connectable to one of a plurality of ceiling anchors 78 on ceiling 20, and each lower point 76 is connectable to one of a plurality of floor anchors 80 on floor 18.

In some examples, the plurality of ceiling anchors 78 are of a first quantity, the plurality of floor anchors 80 are of a second quantity, and the plurality of tension devices 16 are of a third quantity, wherein the second quantity is greater than the third quantity. In some examples, the first quantity of the plurality of ceiling anchors 78 is four to match the quantity of tension devices 16, so there is no confusion as to where the plurality of tension devices 16 should be installed. In some examples, the second quantity of the plurality of floor anchors 80 is greater than the quantity of tension devices 16, so there will be extra unused floor anchors 80 that are available for securing various other items to floor 18.

In some examples, tension devices 16 are interconnected by some means, e.g., via a manifold 82 that connects the four tension devices 16 in fluid communication with each other. In some examples, manifold 82 comprises one or more hoses for conveying a fluid 84 (e.g., hydraulic fluid, air, etc.).

Figure 2:
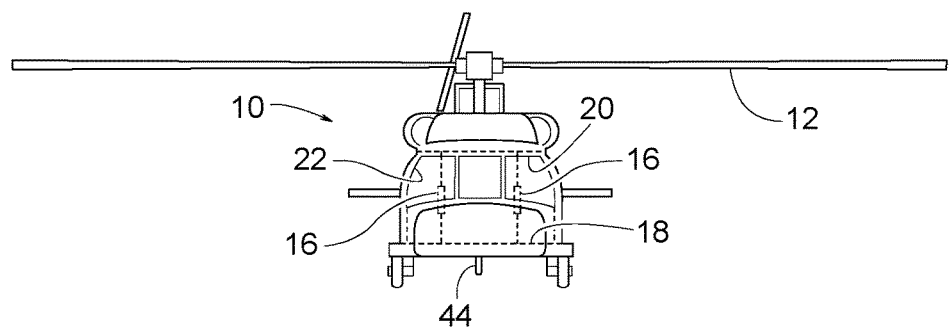
FIG. 2 is a front view of FIG. 1 but with the dynamic load-sharing system in an installed position.

FIG. 2 shows a front view of aircraft 12. In some examples, the plurality of tension devices 16 are distributed in a generally rectangular pattern across floor 18 and ceiling 20. In examples that include four tension devices 16, as shown in FIGS. 1-3, two tension devices 16 are in front of two other tension devices 16, and two tension devices 16 are on the left side of aircraft 12 while the two other tension devices 16 are on the right side.

FIGS. 3-7, and 11-17 show two tension devices 16 on the left side of aircraft 12, while the other two tension devices 16, on the right side of aircraft 12, are hidden from view. So, each of the examples shown in FIGS. 3-7, and 11-17, include a total of four tension devices 16. However, other examples of load-sharing system 10 include more or less than four tension devices 16.

Figure 3:
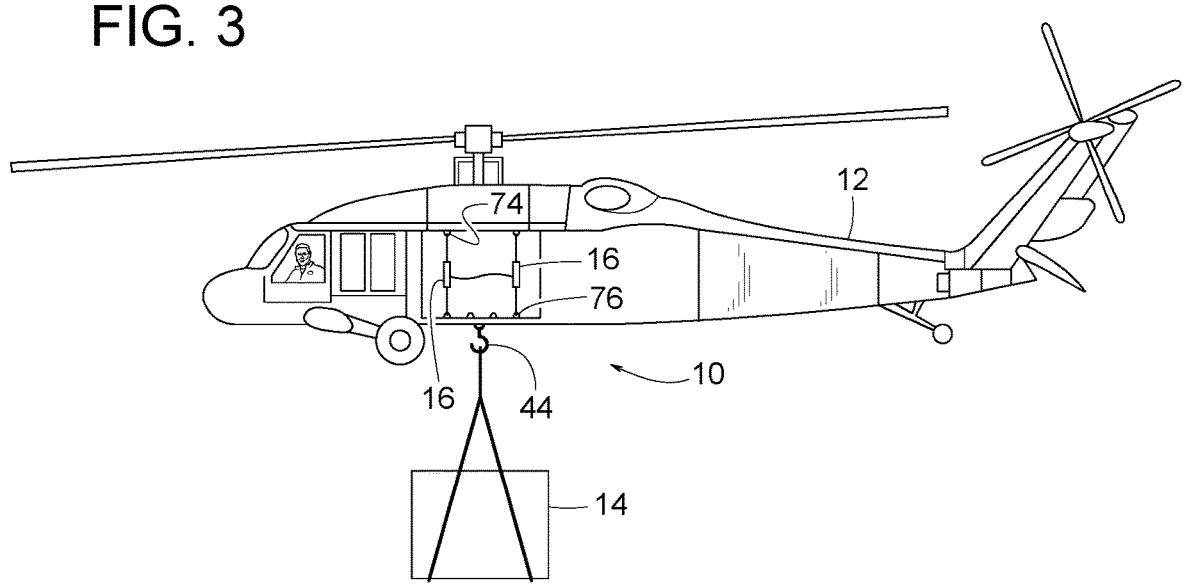
FIG. 3 is a side view similar to FIG. 1 but showing the dynamic load-sharing system installed and a load hanging from the aircraft.

FIG. 3 shows load 14 being suspended from hook 44. In FIGS. 2 and 3, each tension device 16 is in an installed position coupling floor 18 to ceiling 20. In FIG. 1 tension devices 16 are in a removed position, but arrow 72 shows they are in the process of being installed. In the removed position, tension device 16 is spaced apart from ceiling 20 and/or floor 18.

Figure 4:
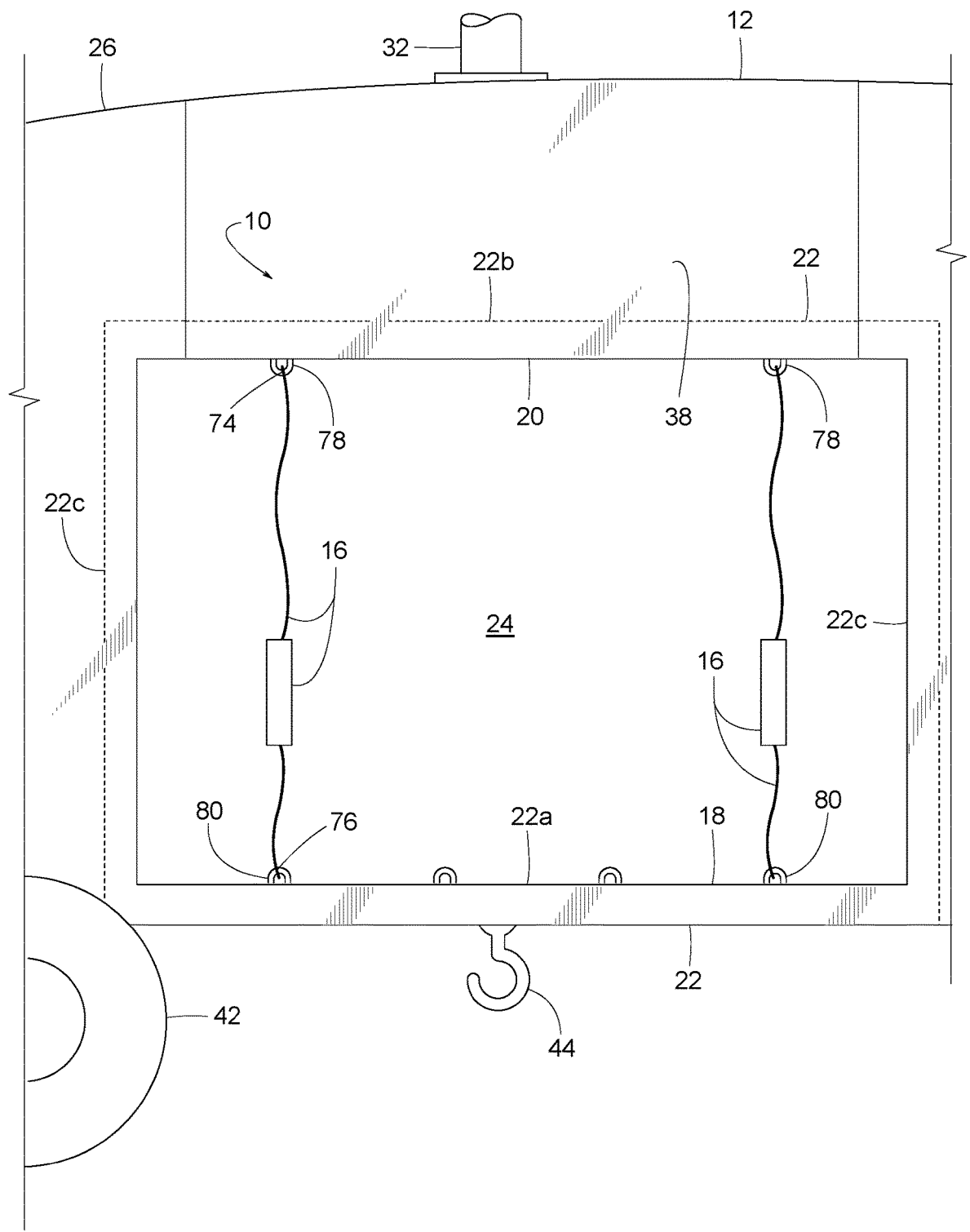
FIG. 4 is a side view schematically illustrating an example dynamic load-sharing system installed in a cabin space of an aircraft.

FIG. 4 shows tension devices 16 in their installed position. Tension devices 16 are shown generally relaxed and unstressed, as no load 14 is currently hanging from hook 44.

Figure 5:
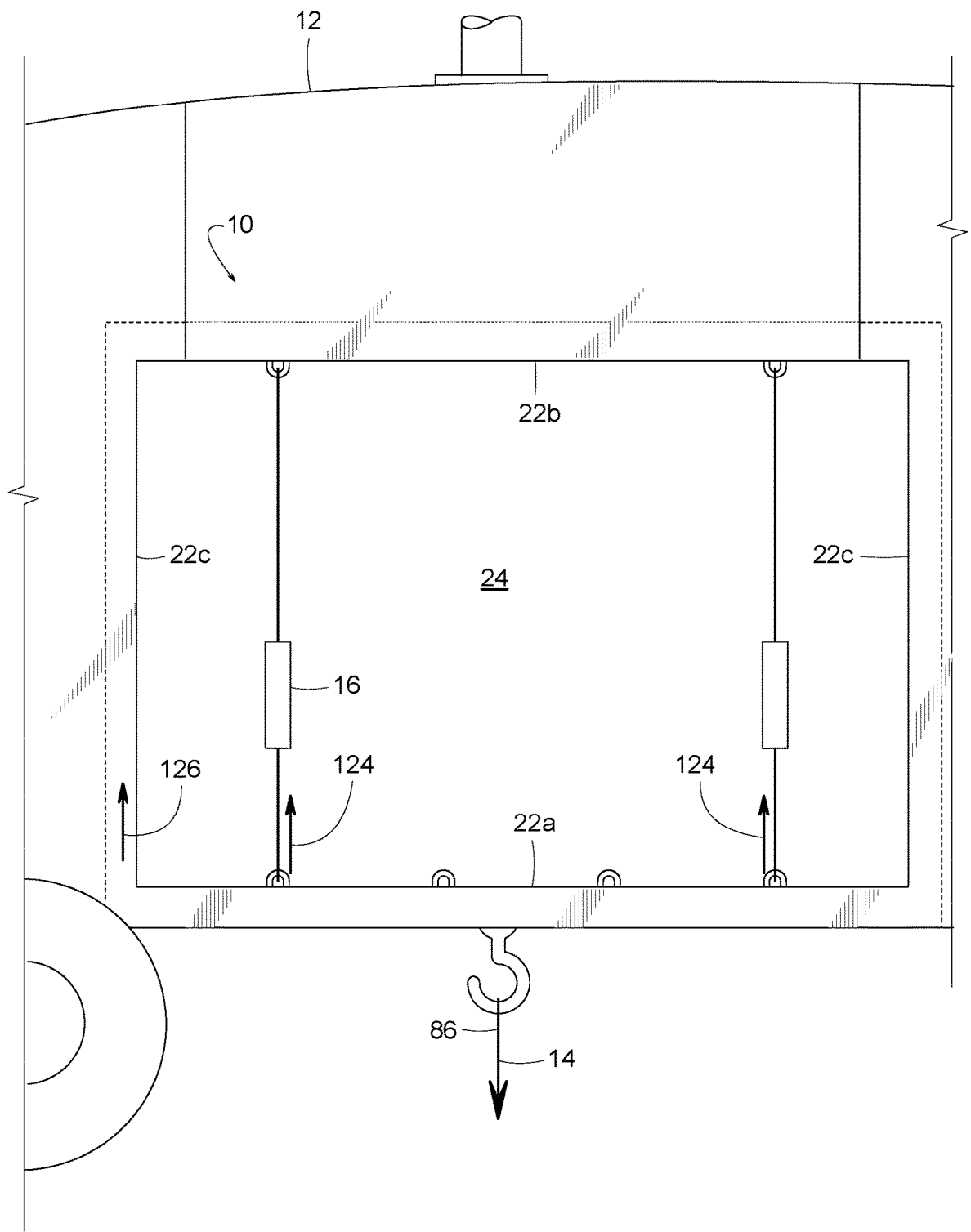
FIG. 5 is a side view similar to FIG. 4 but showing an example airframe and an example dynamic load-sharing system responding to a downward force from a suspended load.
Figure 6:
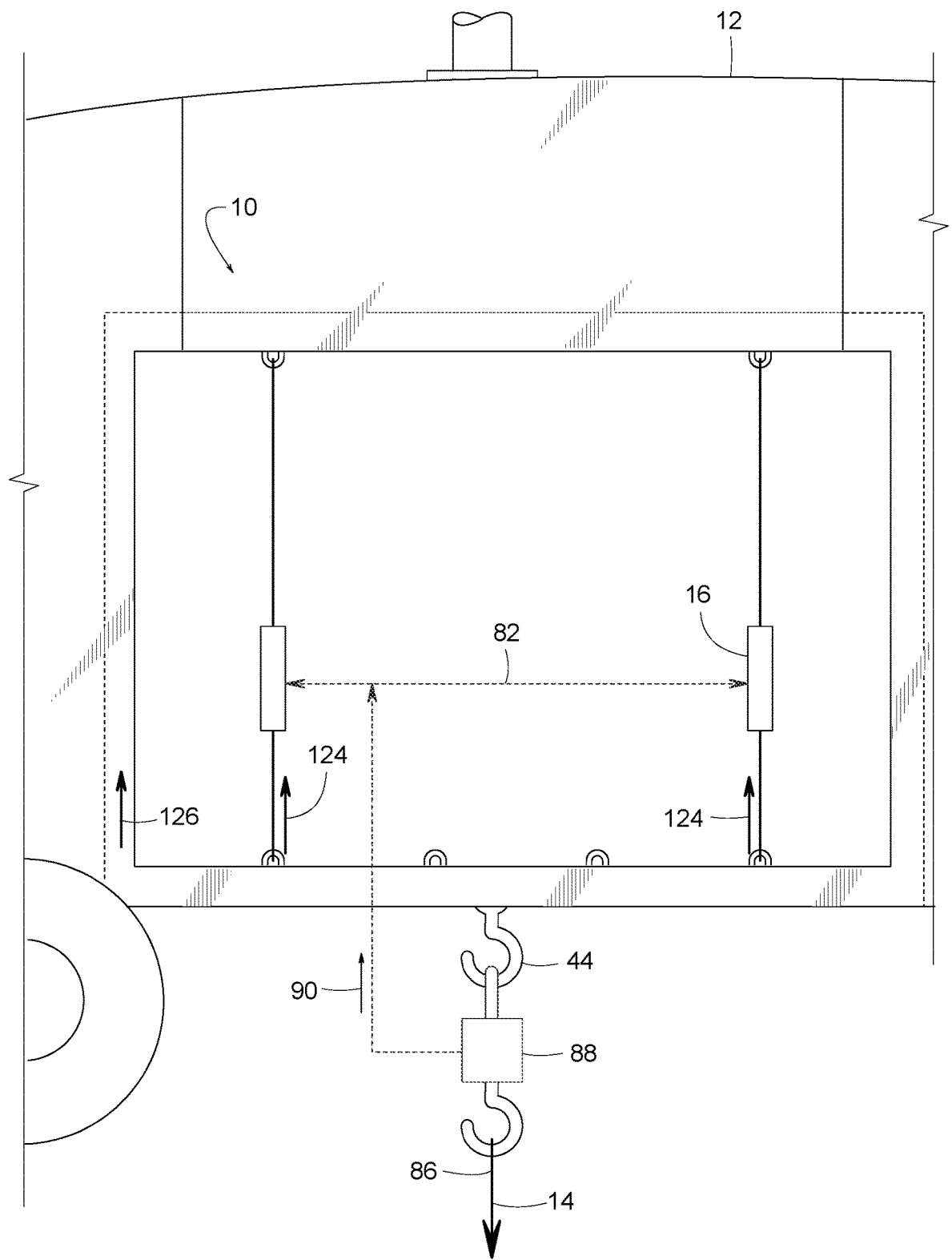
FIG. 6 is a side view similar to FIG. 5 but showing an example dynamic load-sharing system responding to an output from an example load sensor.

FIG. 5 shows a downward force 86 applied to hook 44 as a result of load 14 being suspended from hook 44. The magnitude of force 86 is generally equal to the weight of load 14; however, vertical acceleration and vibration of aircraft 12 can affect this. Hook 44 transmits force 86 to floor beam 22a, while tension devices 16 and side beams 22c collectively transmit force 86 from floor beam 22a to transmission-supporting beam 22b. Force 86 causes airframe 22 to stretch vertically, which pulls tension devices 16 taut. Without tension devices 16, the airframe's vertical stretch between floor 18 and ceiling 20 would be much greater.

To reduce this stretch, and thus reduce the strain and fatigue of airframe 22, some examples of dynamic load-sharing system 10 sense the magnitude of the load's weight with a load sensor 88 (e.g., load sensor 88a, 88b and 88c). In some examples, load sensor 88 is carried on the aircraft's hook 44. Load sensor 88 provides an output 90 that varies with the load's weight. In some examples, output 90 is conveyed directly or indirectly or wirelessly to each tension device 16, which responds accordingly by sharing a desired percentage or portion of load 14 with airframe 22. In some examples, manifold 82 ensures that each of the plurality of tension devices 16 carry the same load, transmit the same tensile force, and thus experience the same stress.

Some examples of dynamic load-sharing system 10 include a fitting 85 on manifold 82. Fitting 85 can be used for connecting an optional pressure transducer 87 for monitoring the fluid pressure in manifold 82. In some examples, pressure transducer 87 provides an output signal 89 (e.g., 0-5 VDC, 4-20 mA, etc.) that varies in proportion to the fluid pressure in manifold 82, wherein the fluid pressure is a function of the downward force 86 exerted by load 14. Thus, pressure transducer 87 provides a means for tracking and recording the variation of downward force 86 versus time and/or versus the GPS location of aircraft 12. In some examples, the pressure can be logged to create a history showing what loads were carried or released at particular times and locations. Such a log might also show instances of notable shock loads.

Figure 7:
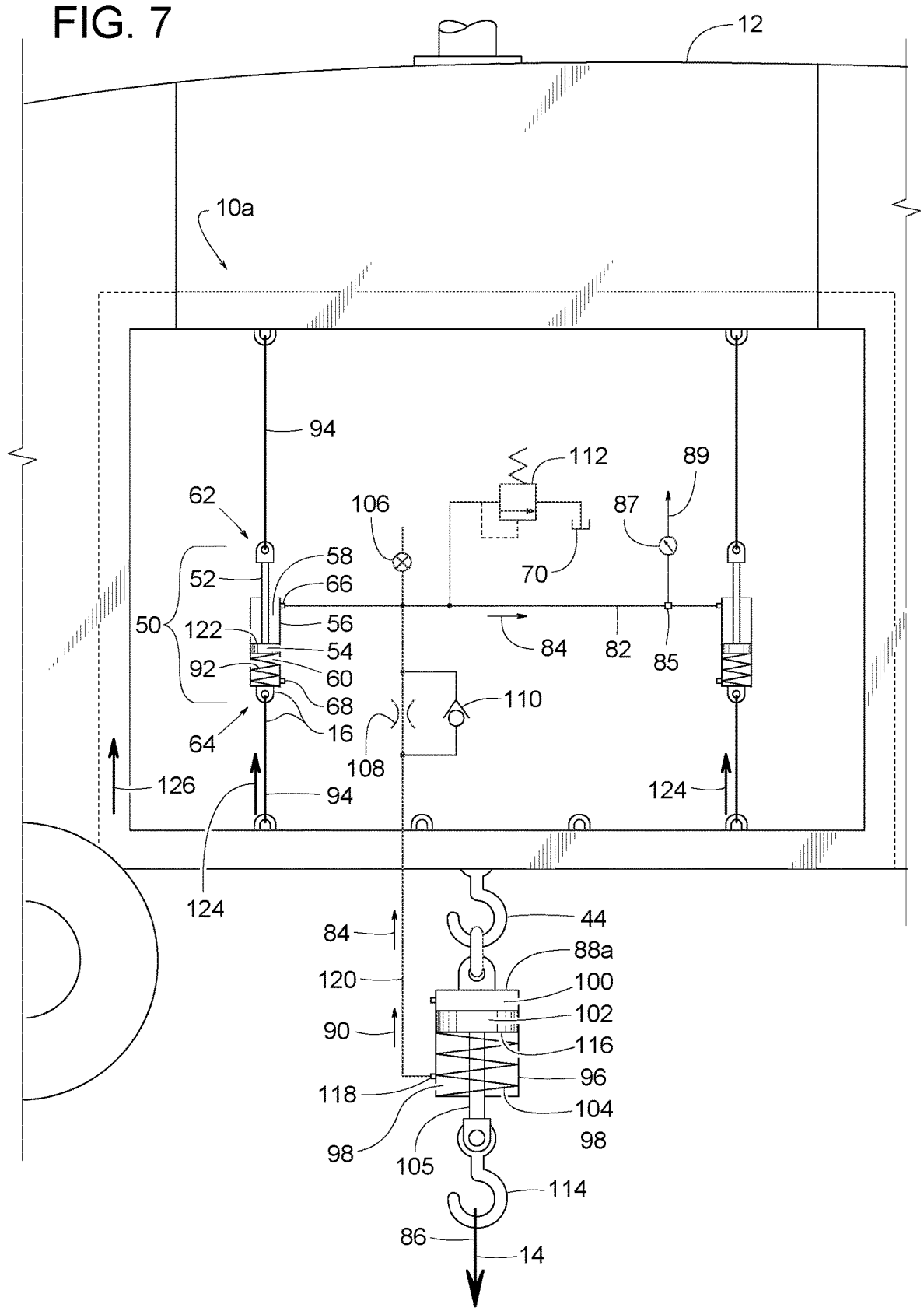
FIG. 7 is a schematic side view of one example of the dynamic load-sharing system shown in FIG. 6.

In the example shown in FIG. 7, each tension device 16 comprises driven piston/cylinder device 50. Some examples of driven piston/cylinder device 50 include a compression spring 92 in cap-end chamber 60 for urging driven piston/cylinder device 50 to an extended position. In some examples, one or more elongate members 94 connect opposite ends of driven piston/cylinder device 50 to anchors 78 and 80. Some examples of elongate member 94 include cables, straps, chains, rods, and various combinations thereof.

In some examples, load sensor 88 is a driving piston/cylinder device 88a with a larger piston diameter than that of driven piston/cylinder device 50. Some examples of piston/cylinder device 88a include a cylinder 96, a rod-end chamber 98, a cap-end chamber 100, a piston 102, a rod 105, and a compression spring 104. In some examples, compression spring 104 pushes against piston 102 to urge piston/cylinder device 88a to retract. In some examples, load sensor 88 is installed between hook 44 and load 14.

Some examples of dynamic load-sharing system 10 further include one or more additional components such as, for example, manifold 82 (e.g., a hose assembly connecting load sensor 88 to multiple tension devices 16); a bleed valve 106 for releasing air trapped within manifold 82, load sensor 88 and driven cylinders 50; a flow restriction 108 (e.g., an orifice, capillary, valve, etc.) for slowing the tension member's response to a sudden increase in load 14 as sensed by load sensor 88; a check valve 110 for hastening the unloading of tension devices 16 (e.g., during an emergency load dropping incident); and a pressure relief valve 112 for limiting the maximum force that tension devices 16 can transmit to anchors 78 and 80.

In some example modes of operation, load 14 hanging from a hook 114 underneath load sensor 88*a* forces piston 102 to pressurize fluid 84 in rod-end chamber 98 of load sensor 88*a*. In some examples, fluid 84 is hydraulic fluid (e.g., oil) or some other generally incompressible liquid. In other examples, fluid 84 is air, nitrogen or some other gas.

In the illustrated example, load sensor 88*a* pressurizes fluid 84 to a pressure generally equal to the weight of load 14 divided by an effective area 116 of piston 102. The effective area is the amount of piston area axially facing the more pressurized side of the piston. In the illustrated example, effective area 116 basically equals the piston's outer diameter squared times pi divided by four and then minus the axial area of piston 102 covered by rod 105, wherein the area covered by rod 105 basically equals the rod's outer diameter squared times pi divided by four. In examples where cap-end chamber 100 is the more pressurized side of piston 102, then the effective area 116 basically equals the piston's outer diameter squared times pi divided by four (none of the cap-end side of the piston is covered by rod 105).

In some examples, the load sensor's cap-end chamber 100 is filled with air or some other gas. In some examples, load sensor 88*a* includes a cap-end port 116 that is open to atmosphere. In some examples, load sensor 88*a* includes a rod-end port 118 connected to a hose 120, wherein hose 120 conveys output 90 in the form of hydraulic fluid at a pressure proportional to the magnitude of load 14. In some examples, flow restriction 108 and/or check valve 110 connects hose 120 in fluid communication with manifold 82. Thus, in some examples, the fluid pressure in the load sensor's rod-end chamber 98 is substantially equal to the fluid pressure in rod-end chamber 58 of each tension device 16.

In some examples, each driven piston/cylinder device 50 of tension device 16 has an effective area 122 facing the pressurized fluid 84 in rod-end chamber 58. The effective area 122 of each tension device 16 and the effective area 116 of load sensor 88*a* are sized relative to each other such that for a given load weight (downward force 86), each tension device 16 transmits a certain desired tensile force 124 between floor 18 and ceiling 20. In some examples, when the magnitude of the suspended load (downward force 86) is below a predetermined threshold force, the tensile force 124 transmitted by driven cylinder 50 increases with an increase in the magnitude of the suspended load 14 as sensed by load sensor 88.

In some examples, pressure relief valve 112 establishes a predetermined maximum allowable limit of tensile force 124. In some examples, when the magnitude of the suspended load 14 (downward force 86) equals or exceeds the predetermined threshold, pressure relief valve 112 opens to prevent the pressure in the tension device's rod-end chamber 58 from getting any higher. So, when the magnitude of suspended load 14 is within a load range that is above the predetermined threshold, the tensile force 124 transmitted by driven cylinder 50 is limited to a substantially constant maximum allowable tensile force.

The relative sizes of effective areas 116 and 122 establish how load 14 is allocated or shared between airframe 22 and tension devices 16. Arrow 126 (airframe force 126) represents transmitting a first portion of load weight 14 through airframe 22 (via sidewall beams 22*c*). Arrows 124 (tensile force 124) represents transmitting a second portion of load weight 14 from floor 18 to ceiling 20 via tension devices 16. To determine the desired percentage or portion of the load weight 14 transmitted by tension devices 16 (tensile force 124) versus the percentage transmitted through the airframe's side beams 22*c* (airframe force 126), a designer may consider various factors such as the type of aircraft 12, its age, anticipated loads, and other factors deemed important to the designer or user.

Figure 8:
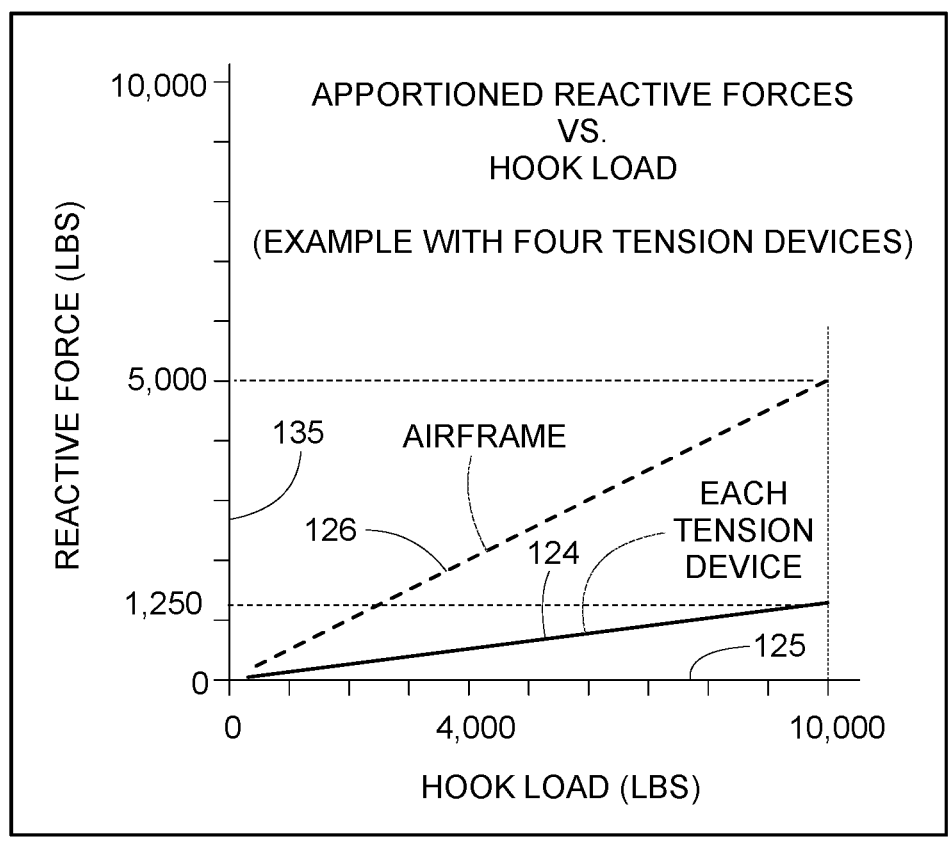
FIG. 8 is a graph showing how a hook load is shared between an airframe and a plurality of tension devices.
Figure 9:
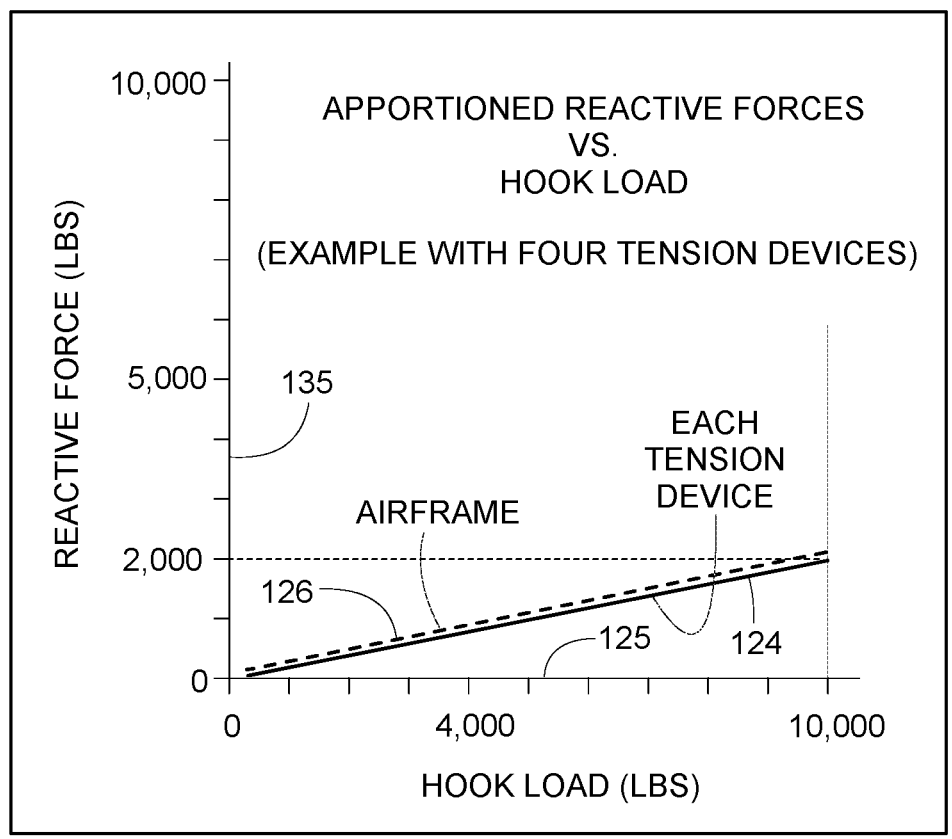
FIG. 9 is a graph showing another way a hook load can be shared between an airframe and a plurality of tension devices.
Figure 10:
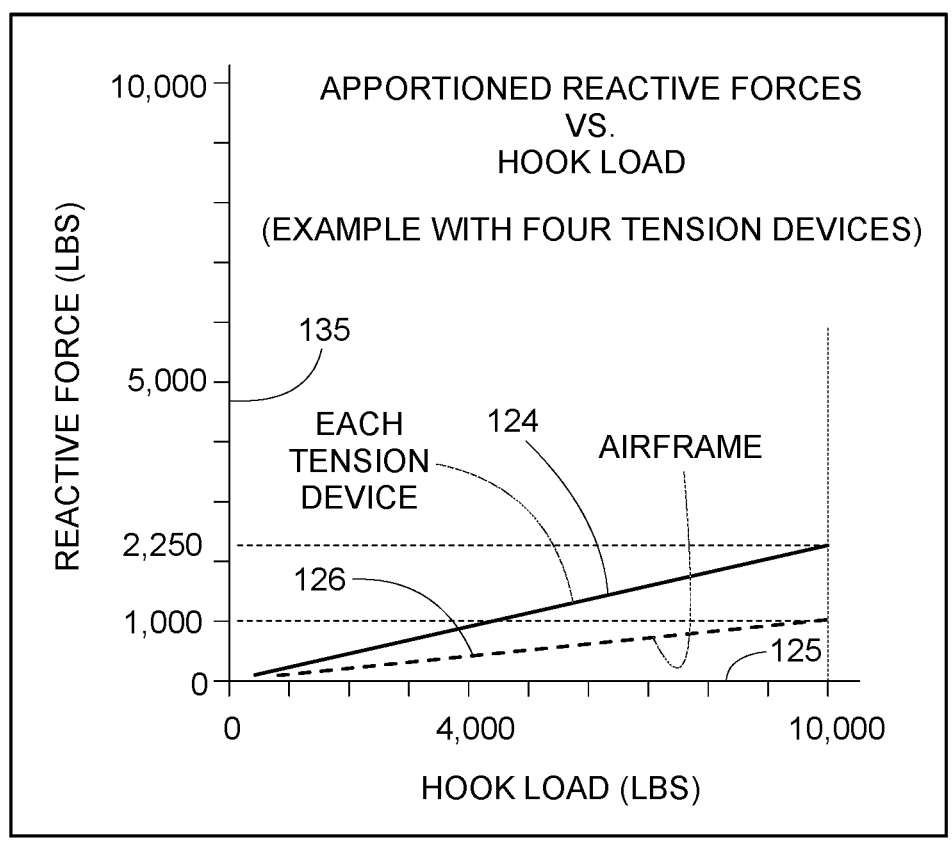
FIG. 10 is a graph showing yet another way a hook load can be shared between an airframe and a plurality of tension devices.

FIGS. 8-10 show some examples of how load 14 is shared between airframe 22 and tension devices 16. For sake of example, FIGS. 8-10 are for example dynamic load-sharing systems 10 that happen to have one load sensor 88 and four tension devices 16. Other examples of load-sharing system 10 include more or less than four tension devices 16; however, the graphs represent examples of dynamic load-sharing system 10 that have four tension devices 16.

Each of the graphs shown in FIGS. 8-10 includes an X-axis 125 and a Y-axis 135. X-axis 125 represents the magnitude of downward force 86. Y-axis 135 represents the reactive upward force exerted by the airframe's sidewall beam 22*c* (airframe force 126). Y-axis 125 also represents the upward force exerted by each individual tension device 16 (tensile force 124).

In the example shown in FIG. 8, a piston ratio of the load sensor's effective area 116 to the effective area 122 of each individual driven cylinder 50 is about 8.3. Such a piston ratio results in airframe 22 (i.e., the airframe's sidewall beams 22*c*) carrying about 50% of load 14, and the four tension devices 16 cumulatively carrying about 50% as well. Since there are four tension devices 16 in this example, each individual tension device carries about 12.5% of the total load (50%/4=12.5%). So, if the magnitude of load 14 (downward force 86) is 10,000 lbs, then the airframe's sidewall beams 22*c* carry about 5,000 lbs (airframe force 126), and the four tension devices 16 collectively carry about 5,000 lbs.

Four tension devices 16 collectively carrying 5,000 lbs means that each individual tension device 16 carries 1,250 lbs (5,000/4=1,250), as shown in the graph. FIG. 8 shows force 124 of each individual tension device 16 is 1,250 lbs when load 14 is at 10,000 lbs. FIG. 8 shows force 126 of airframe 22 is 5,000 lbs when load 14 is at 10,000 lbs.

In some examples, it is desirable to have the airframe's sidewall beams 22*c* carry most of load 14. This can be desirable in examples where it is important to have tension devices 16 of minimal size and weight. So, in such examples, it is beneficial to have the piston ratio be as much as 12.0.

In the example shown in FIG. 9, airframe 22 (i.e., the airframe's sidewall beams 22*c*) carries about 20% of load 14, while each tension device 16 also carries about 20% (total of 80% for all four tension devices 16). So, if the magnitude of load 14 (downward force 86) is 10,000 lbs, the airframe's sidewall beams 22*c* carry about 2,000 lbs (airframe force 126), while each of the four tension devices 16 also carry about 2,000 lbs (tensile force 124). When each of tension devices 16 carries 2,000 lbs, then four tension devices 16 cumulatively carry 8,000 lbs (2,000×4=8,000). So, in this example, when load 14 is 10,000 lbs, airframe 22 carries 2,000 lbs, while the four tension devices 16 cumulatively carry 8,000 lbs. To achieve such a load-sharing relationship, a piston ratio of the load sensor's effective area 116 to the effective area 122 of each driven cylinder 50 is about 5.2.

FIG. 10 shows an example where it is desirable to protect airframe 22 as much as possible due to the airframe's age or weakened condition. In the example of FIG. 10, airframe 22 (i.e., the airframe's sidewall beams 22*c*) carries about 10% of load 14, while each tension device 16 carries about 22.5%

(total of 90% for all four tension devices 16). So, if the magnitude of load 14 (downward force 86) is 10,000 lbs, the airframe's sidewall beams 22c carry about 1,000 lbs (airframe force 126), while each of the four tension devices 16 carry about 2,250 lbs (tensile force 124). When each of tension devices 16 carries 2,250 lbs, then four tension devices 16 cumulatively carry 9,000 lbs (2,250×4=9,000). So, in this example, when load 14 is 10,000 lbs, airframe 22 carries 1,000 lbs, while the four tension devices 16 cumulatively carry 9,000 lbs. To achieve such a load-sharing relationship, a piston ratio of the load sensor's effective area 116 to the effective area 122 of each driven cylinder 50 is about 4.6. Considering the examples just described, it can be desirable to provide dynamic load-sharing system 10 with a piston ratio of 4.6 to 12.0.

Moreover, in each of the aforementioned examples, it should be noted that the tensile force 124 in each tension device 16 increases proportionally with the magnitude of load 14. And manifold 82 ensures that the tensile force 124 is the same in each tension device 16.

It should also be noted that vertical stretch of airframe 22 increases with the magnitude of load 14. To reduce this stretch, and thus reduce the strain in airframe 22, tension device 16 is designed to share some of load 14 in proportion to the magnitude of the load's weight. Tension device 16 being too stiff can cause undo strain in tension device 16 and possibly overload anchors 78 and 80. Tension device 16 being too elastic can result in airframe 22 having to carrying an excessive share of load 14, which can increase airframe fatigue. Consequently, tension device 16 must be properly designed. Moreover, dynamic load-sharing system 10 preferable has a feature that limits the maximum load tension device 16 can carry to avoid overloading anchors 78 and 80.

In some examples, pressure relief valve 112 establishes a predetermined maximum allowable limit to prevent tension device 16 from ever overloading any ceiling anchors 78 or floor anchors 80. For instance, in some examples, pressure relief valve 112 might be set to limit the pressure in manifold 82 and rod-end chamber 58 so as to limit tensile force 124 in each tension device 16 to, say, 1,000 lbs. In this example, when the magnitude of suspended load 14 is below the predetermined threshold (e.g., the magnitude of load 14 that results in 1,000 lbs being carried by each of tension devices 16), tensile force 124 transmitted by tension device 16 (driven cylinder) increases with an increase in the magnitude of the suspended load 14 as sensed by the load sensor 88. And when the magnitude of suspended load 14 is within a load range that is above the predetermined threshold, pressure relief valve 112 ensures that tensile force 124 transmitted by each tension device 16 (driven cylinder) is at a substantially constant maximum allowable tensile force of 1,000 lbs.

In some examples, if load 14 exceeds the predetermined threshold, pressure relief valve 112 enables tension devices 16 to continue carrying at least some safe level of force 126 without "breaking away" entirely, as would be the case if a shear pin were used instead of pressure relief valve 112. If a shock load (e.g., log slipping on a slack choker) caused a shear pin to break away, the entire shock load would be transmitted through airframe 22. In addition to or alternatively, an accumulator (e.g., accumulator 136) can be used to help establish the tension device's predetermined threshold.

Figure 11:
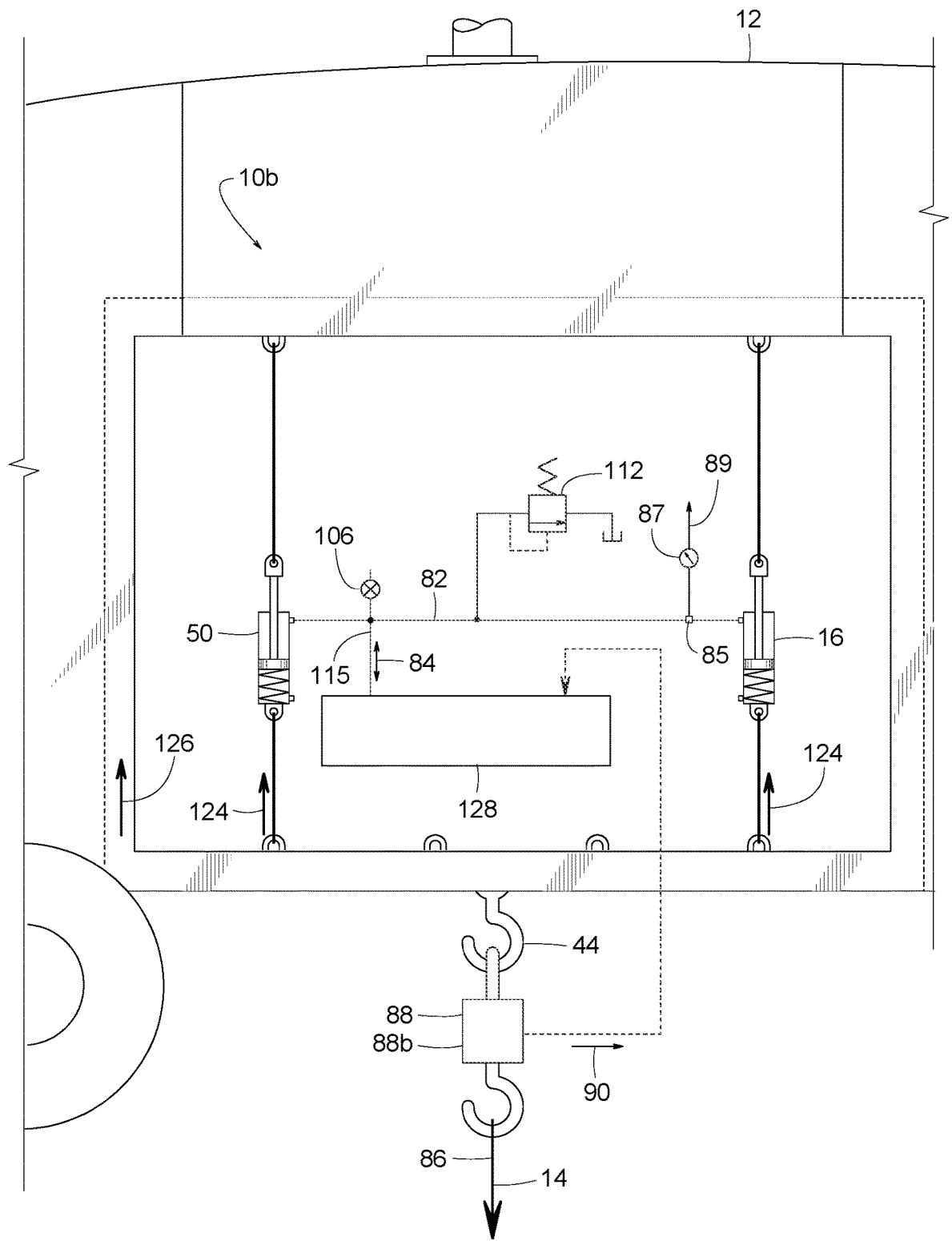
FIG. 11 is a schematic side view similar to FIGS. 6 and 7 but showing another example of a dynamic load-sharing system constructed in accordance with the teachings disclosed herein.

In the example shown in FIG. 11, dynamic load-sharing system 10b includes load sensor 88 is in the form of a known load cell transducer 88b instead of piston/cylinder device 88a. In this example, the load cell's output 90 is an electrical signal (e.g., 0-5 VDC or 4-20 mA) that varies with the magnitude of load 14. Output 90 is conveyed to a pump system 128. Pump system 128 (fluid pressure source) forces fluid 84 through a line 115 to manifold 82 at a fluid pressure that varies in proportion to output 90. The pressurized fluid 84 in manifold 82 is delivered to each tension device 16, which then functions in a manner similar to the example shown in FIG. 7.

Figure 12:
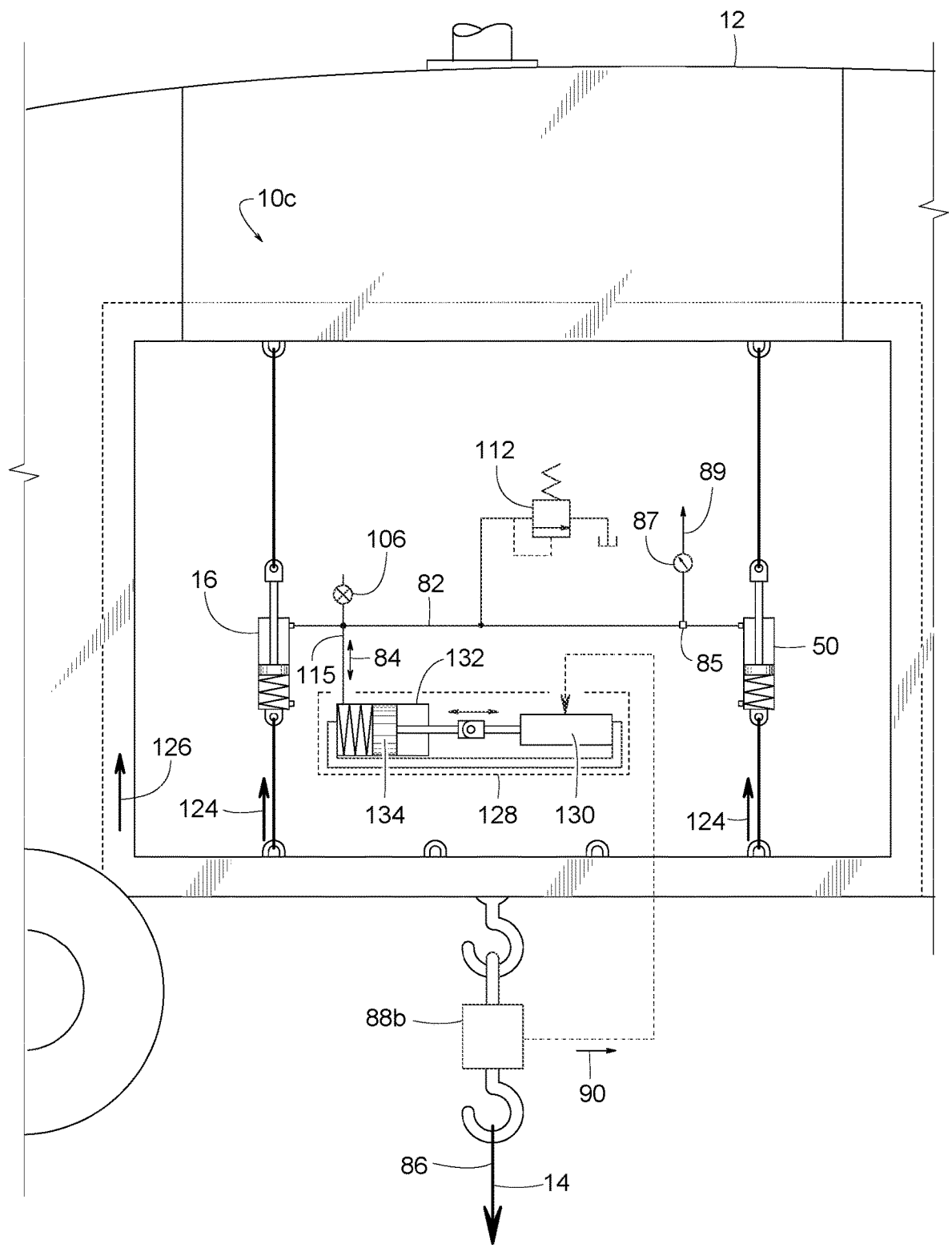
FIG. 12 is a schematic side view showing a more specific example of the dynamic load-sharing system shown in FIG. 11.

Some examples of pump system 128 are constructed as shown in FIG. 12. In this example, pump system 128 of dynamic load-sharing system 10c includes a linear actuator 130 coupled to a piston/cylinder device 132. Linear actuator 130 drives the position of a piston 134 of piston/cylinder device 132 to vary the pressure of fluid 84 delivered to manifold 82 and tension devices 16. Linear actuator 130 drives the position of piston 134 in response to output 90 from load sensor 88b such that the pressure of fluid 84 varies in proportion to the magnitude of load 14.

Figure 13:
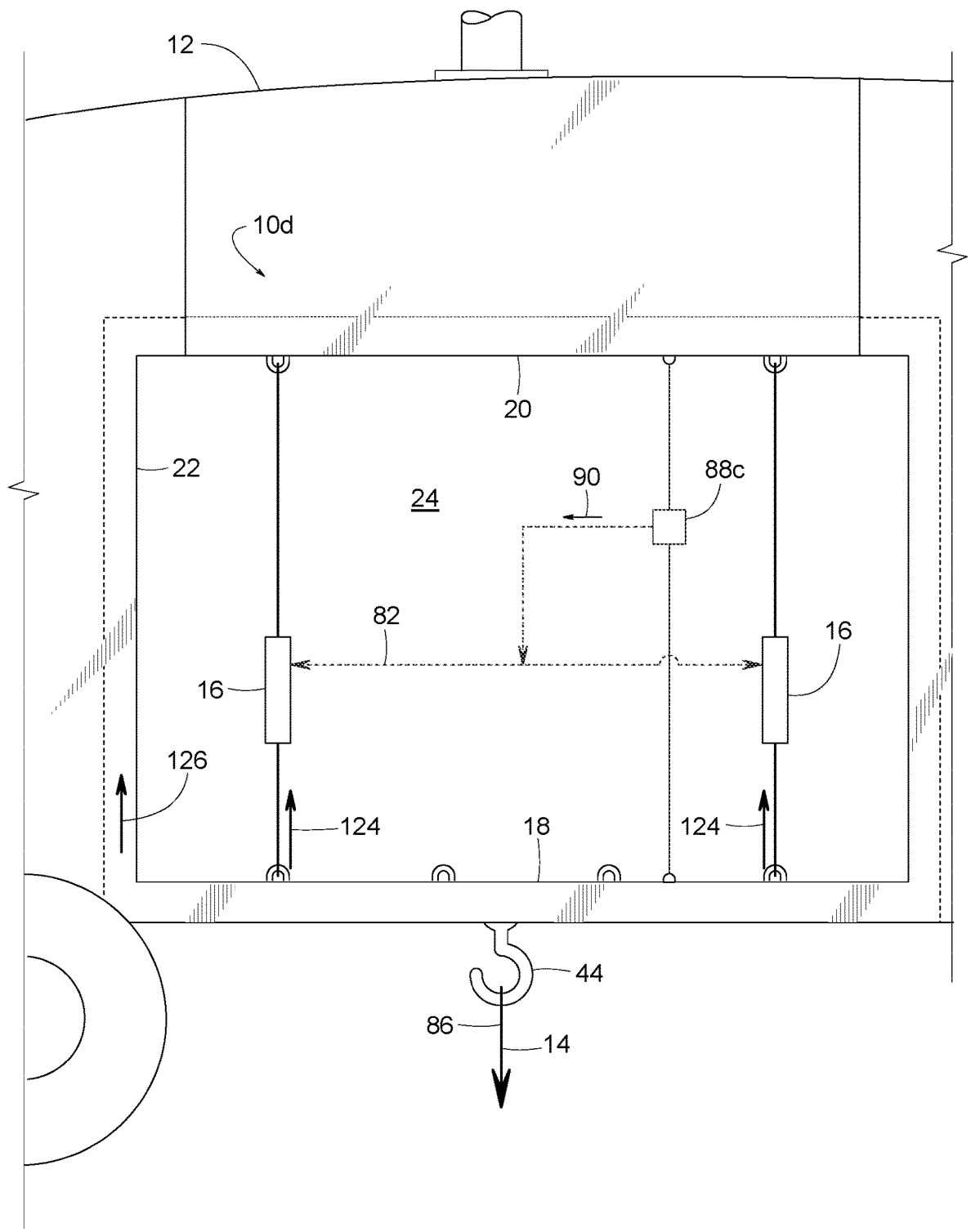
FIG. 13 is a schematic side view showing another example dynamic load-sharing system constructed in accordance with the teachings disclosed herein.

In the example shown in FIG. 13, dynamic load-sharing system 10d includes tension devices 16 that are controlled in response to an output 90 from a load sensor 88c installed within aircraft 12 instead of hanging from hook 44. Load sensor 88c senses the vertical stretch or strain of the aircraft's airframe 22. In some examples, load sensor 88c is connected to sense a vertical elongation of cabin space 24 between floor 18 and ceiling 20. Some examples of load sensor 88c include a string potentiometer, a linear encoder, and a strain gage. In this example, the vertical stretch of airframe 22 is in proportion to the magnitude of load 14. Tension devices 16 respond to the load sensor's output 90 such that tensile force 124 in each tension device 16 varies in proportion to the magnitude of load 14.

Figure 14:
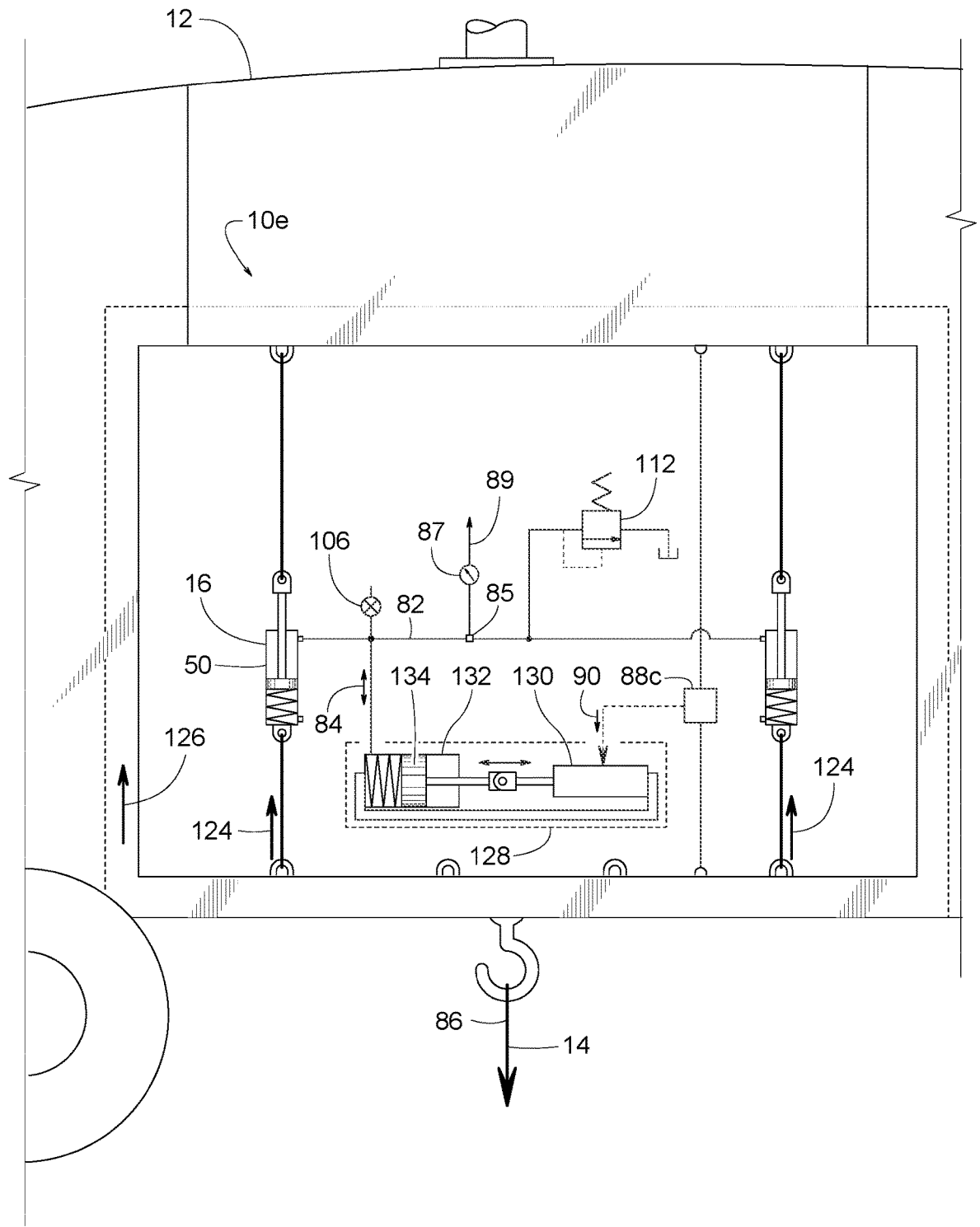
FIG. 14 is a schematic side view showing a more specific example of the dynamic load-sharing system shown in FIG. 13.

FIG. 14 shows a dynamic load-sharing system 10e, which is a more specific example of the general system shown FIG. 13. Dynamic load-sharing system 10e includes pump system 128 (fluid pressure source). In this example, linear actuator 130 drives the position of piston 134 of piston/cylinder device 132 to vary the pressure of fluid 84 delivered to manifold 82 and tension devices 16. Linear actuator 130 drives the position of piston 134 in response to output 90 from load sensor 88c such that the pressure of fluid 84 varies in proportion to the magnitude of load 14.

Figure 15:
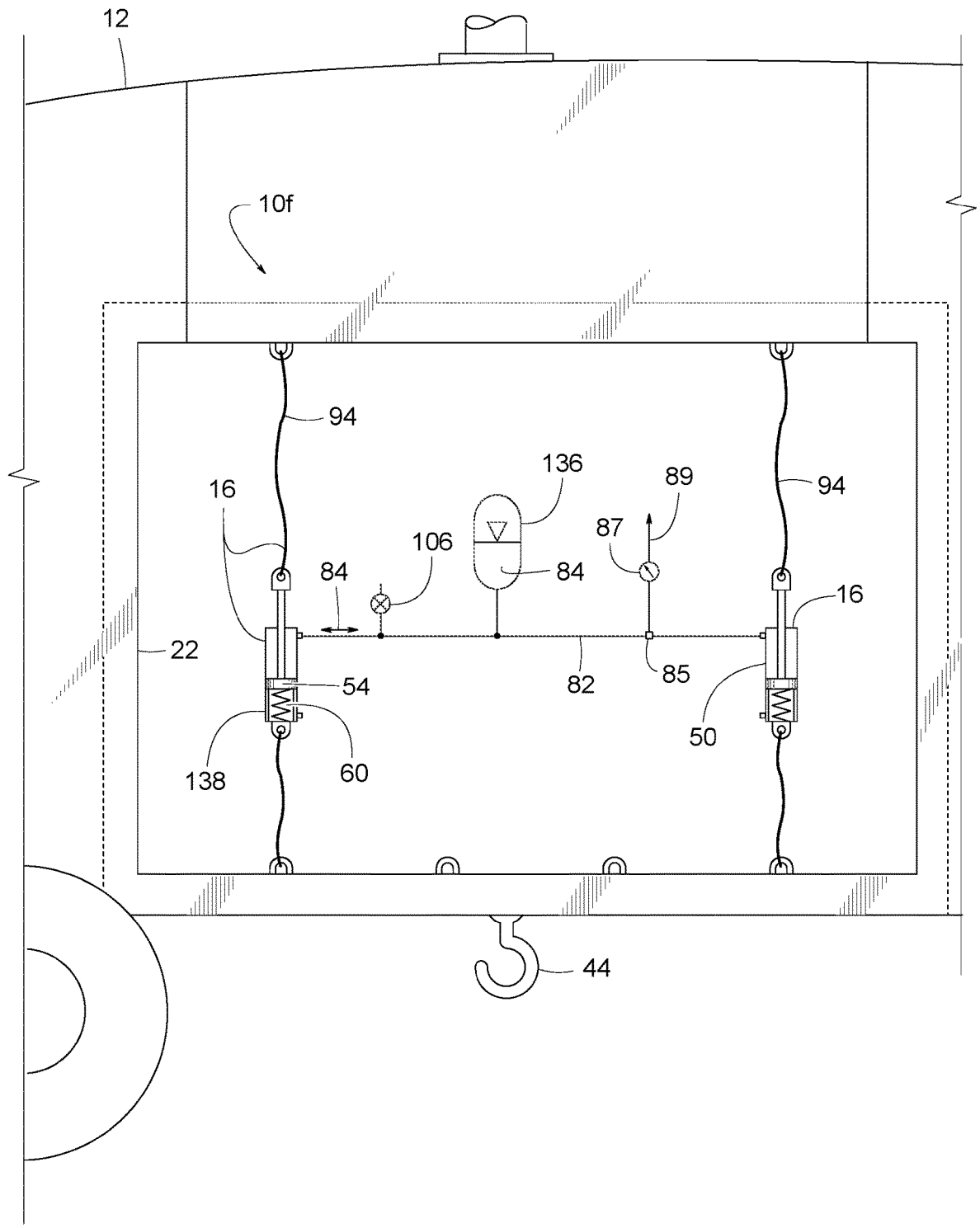
FIG. 15 is a schematic side view showing another example dynamic load-sharing system constructed in accordance with the teachings disclosed herein.
Figure 16:
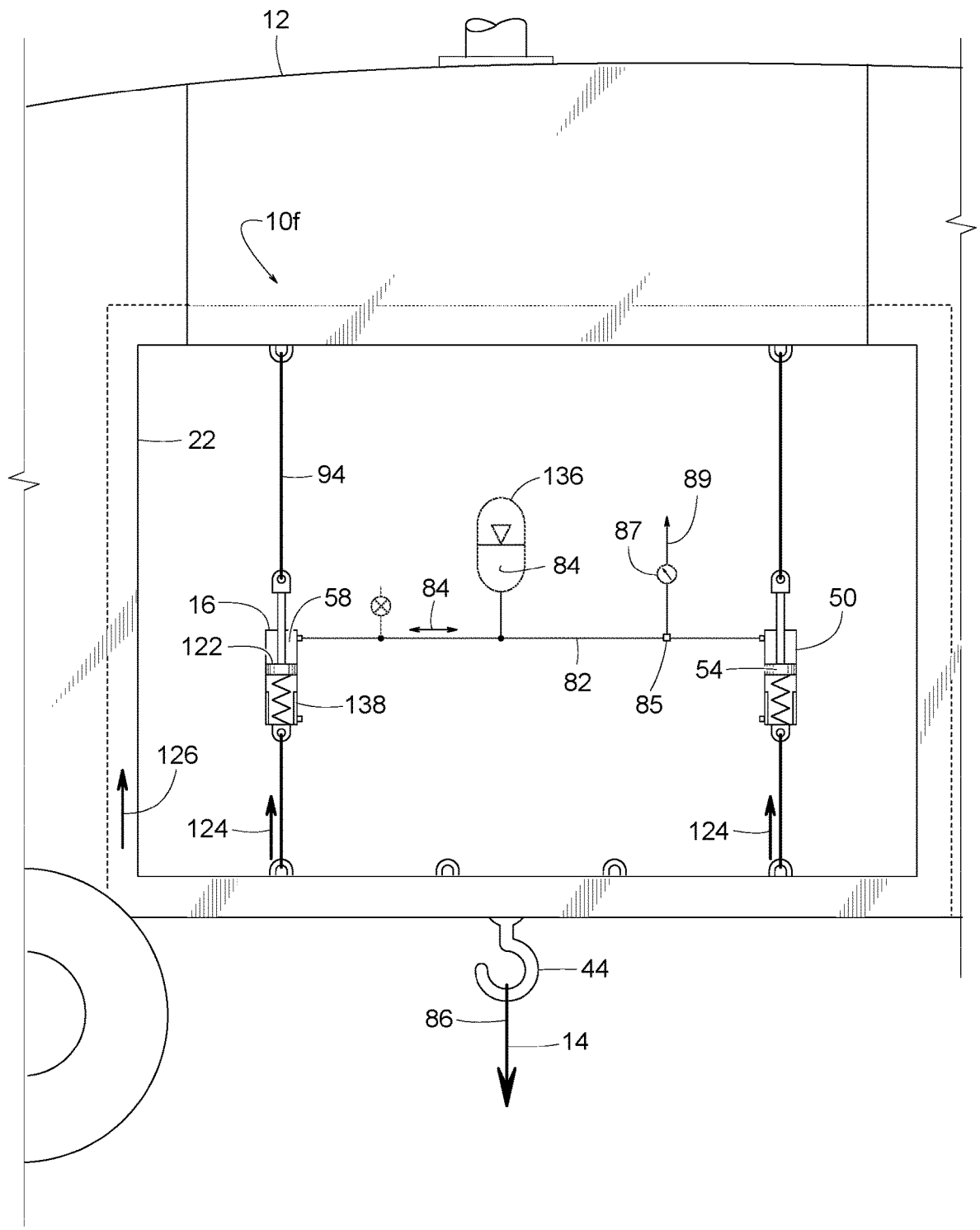
FIG. 16 is a schematic side view similar to FIG. 15 but showing the dynamic load-sharing system responding to a downward force from a suspended load.

FIGS. 15 and 16 show an example dynamic load-sharing system 10f with tension devices 16 being pressurized by fluid 84 from a pressure-charged accumulator 136. Fluid pressure from accumulator 136 urges tension devices 16 to retract. When there is no load 14 and airframe 22 is relaxed, as shown in FIG. 15, piston 54 of tension device 16 bottoms out on a bushing 138 inside cap-end chamber 60 of tension device 16. Bushing 138 stopping piston 54 limits how far tension device 16 can retract. When there is no load 14 hanging from hook 44, the tension device's limited retraction allows elongate member 94 to be sufficiently lax, so tension device 16 and its elongate member 94 can be readily installed or removed from aircraft 12.

When load 14 applies downward force 86 to hook 44, as shown in FIG. 16, the resulting vertical stretch of airframe 22 pulls elongate members 94 taut, which lifts piston 54 away from bushing 60. Tensile force 124 in tension device 16 generally equals the pressure of accumulator 136 times the effective area 122 of piston 54. Manifold 82 connected to accumulator 136 helps ensure multiple tensile devices 16 are equally loaded.

In some examples, airframe 22 experiences additional stretch as downward force 86 increases with an increase in load 14. As airframe 22 stretches, piston 122 forces fluid 84 back into accumulator 136. In some examples, fluid 84 flowing back into accumulator 136 increases the pressure in accumulator 136 and rod-end chamber 58 of each tension device 16. The increased fluid pressure increases tensile force 124. Thus, tensile force 124 increases proportionally with an increase in downward force 86.

Figure 17:
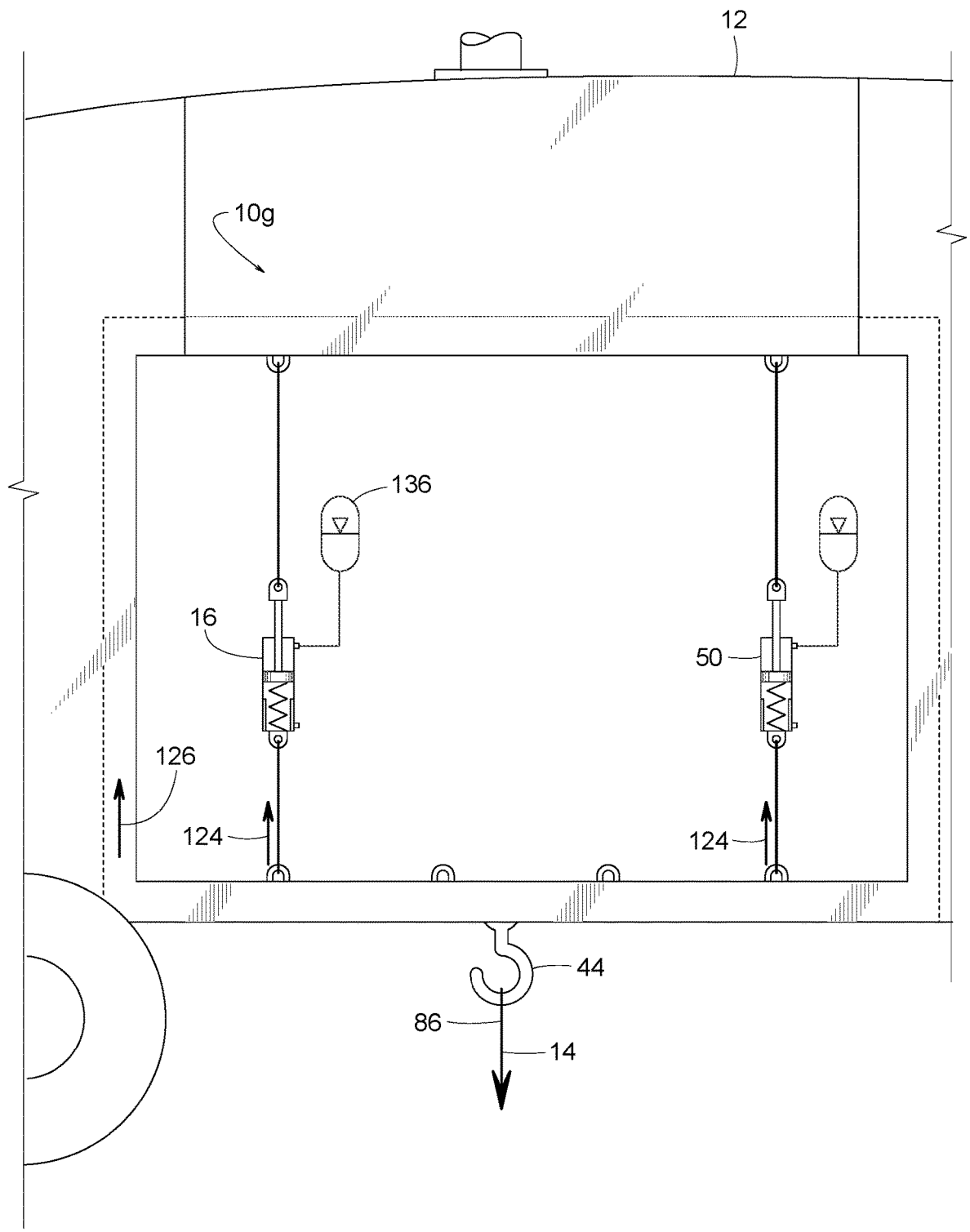
FIG. 17 is a schematic side view showing another example dynamic load-sharing system constructed in accordance with the teachings disclosed herein.

In some examples, as shown in FIG. 17, each tension device 16 of dynamic load-sharing system 10g has its own accumulator 136. This avoids the possible inconvenience and expense of manifold 82 but might not ensure each tension device 16 is equally loaded. With the exception of manifold 82 and one versus multiple accumulators 136, the structure and function of dynamic load-sharing systems 10f and 10g are generally the same.

Figure 18:
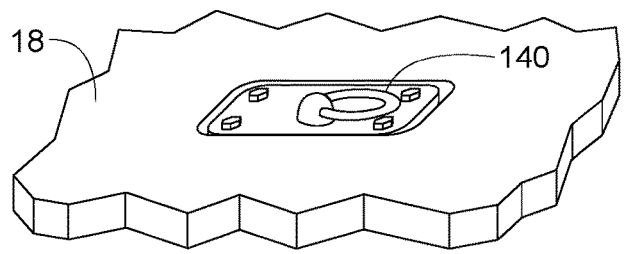
FIG. 18 is a perspective view showing a known tie-down ring attached to a floor of an aircraft.
Figure 19:
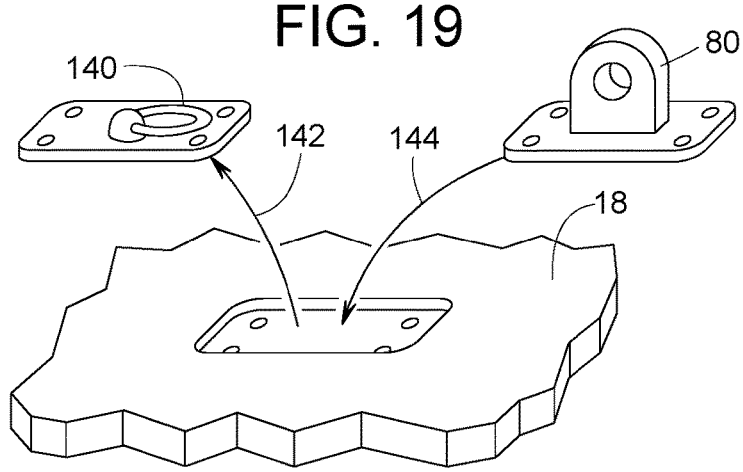
FIG. 19 is a perspective view showing the tie-down ring being replaced by a floor anchor constructed in accordance with the teachings disclosed herein.
Figure 20:
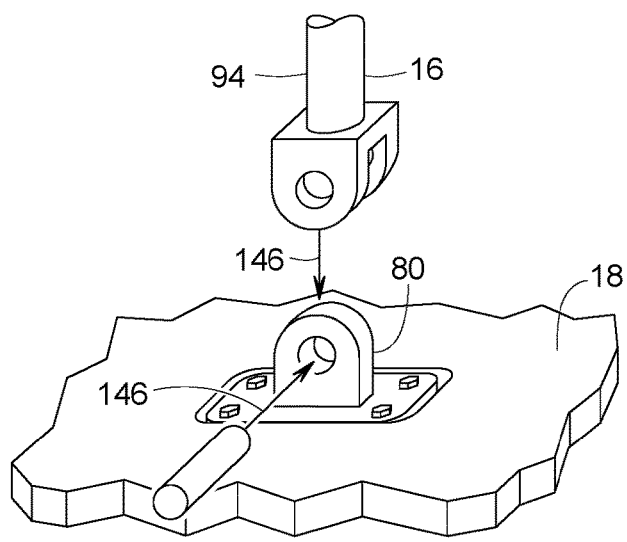
FIG. 20 is a perspective view showing an example tension device being attached to the floor anchor shown in FIG. 19.

FIGS. 18-20 illustrate some methods steps for adapting dynamic load-sharing system 10 to aircraft 12. FIG. 18 shows a conventional example of a floor tie-down ring 140 for securing various items within the aircraft's cabin 24. In some examples, floor anchor 80 provides a sturdier and more convenient means for attaching tension device 16. Consequently, in some examples, it is desirable to replace an existing floor tie-down ring 140 with a more suitable floor anchor 80.

Arrow 142 of FIG. 19 represents removing tie-down ring 140 from a point on floor 18 of aircraft 12. Arrow 144 of FIG. 19 represents installing floor anchor 80 at the point where tie-down ring 140 had been. Arrows 146 of FIG. 20 represents connecting tension device 16 to floor anchor 80.

Figure 21:
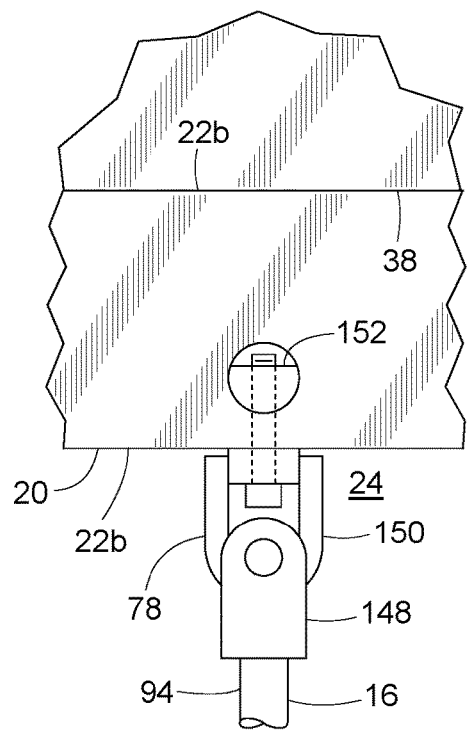
FIG. 21 is a side view showing an example method for connecting a tension device to a transmission-supporting beam at a ceiling of an aircraft.

FIG. 21 shows how, in some examples, tension device 16 is connected the aircraft's ceiling 20. In this example, a clevis 148 connects tension device 16 to a conventional lifting ring 150, which is fastened to a barrel nut 152 in transmission-supporting beam 22b.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A dynamic load-sharing system for protecting the structural integrity of an aircraft carrying a suspended load, the aircraft includes an airframe structure supporting a floor and a ceiling of the aircraft, the aircraft defines a cabin space between the floor and the ceiling, the suspended load being below the floor, the dynamic load-sharing system comprising:
   a load sensor to be carried by the aircraft, the load sensor providing an output that varies in response to a magnitude of the suspended load;
   a tension device that includes an upper point and a lower point, the tension device having selectively an installed position and a removed position, the tension device being at least partially within the cabin space and coupling the floor to the ceiling when the tension device is in the installed position, the tension device being spaced apart from at least one of the ceiling and the floor when the tension device is in the removed position; and
   a driven piston/cylinder device being part of the tension device, the driven piston/cylinder device being situated between the upper point and the lower point of the tension device, the tension device transmitting a tensile force from the lower point to the upper point when the tension device is in the installed position while the suspended load is carried by the aircraft, the tensile force being less than the magnitude of the suspended load, the driven piston/cylinder device being responsive to the output from the load sensor such that when the magnitude of the suspended load is below a predetermined threshold, the tensile force transmitted by the driven cylinder increases with an increase in the magnitude of the suspended load as sensed by the load sensor.

2. The dynamic load-sharing system of claim 1, wherein the output from the load sensor is in a form of fluid pressure.

3. The dynamic load-sharing system of claim 1, wherein when the magnitude of the suspended load is within a load range that is above the predetermined threshold, the tensile force transmitted by the driven cylinder is at a substantially constant maximum allowable tensile force.

4. The dynamic load-sharing system of claim 1, wherein the load sensor includes a driving piston with a first effective area, the tension device includes a driven piston of a second effective area, the first effective area divided by the second effective area defines a piston ratio, and the piston ratio is 4.6 to 12.0.

5. The dynamic load-sharing system of claim 1, wherein the tension device is one of a plurality of tension devices, and each tension device of the plurality of tension devices are substantially equally responsive to the load sensor.

6. The dynamic load-sharing system of claim 5, further comprising a plurality of ceiling anchors at the ceiling and a plurality of floor anchors at the floor, the plurality of tension devices extend between the plurality of ceiling anchors and the plurality of floor anchors, wherein the plurality of ceiling anchors are of a first quantity, the plurality of floor anchors are of a second quantity, the plurality of tension devices are of a third quantity, the second quantity of the floor anchors is greater than the third quantity of tension devices.

7. The dynamic load-sharing system of claim 1, wherein the tension device is one of a plurality of tension devices, each tension device of the plurality of tension devices includes a piston/cylinder device, thus the plurality of tension devices includes a plurality of piston/cylinder devices, and the dynamic load-sharing system further comprising a manifold interconnecting the plurality of piston/cylinder devices in fluid communication with each other.

8. The dynamic load-sharing system of claim 1, wherein the load sensor is a load cell transducer and the output from the load cell transducer is electrical.

9. The dynamic load-sharing system of claim 1, wherein the load sensor is connected to sense a vertical elongation of the cabin space between the floor and the ceiling of the aircraft, the output from the load sensor is electrical, and the vertical elongation increases with an increase in the magnitude of the suspended load.

10. The dynamic load-sharing system of claim 1, further comprising a fluid pressure source providing the tension device with a fluid pressure that varies in response to the output from the load sensor.

11. The dynamic load-sharing system of claim 1, wherein the aircraft is a helicopter with a transmission, the airframe includes a transmission-supporting beam at the ceiling of the aircraft, and the upper point of the tension device is anchored to the transmission-supporting beam when the tension device is in the installed position.

12. A dynamic load-sharing system for protecting the structural integrity of an aircraft carrying a suspended load having a load weight, the aircraft includes an airframe structure supporting a floor and a ceiling of the aircraft, the aircraft defines a cabin space between the floor and the ceiling, the suspended load being below the floor, the dynamic load-sharing system comprising:

a plurality of tension devices extending at least partially within the cabin space and coupling the floor to the ceiling to transmit a portion of the load weight from the floor to the ceiling, each tension device of the plurality of tension devices includes a piston/cylinder device, thus the plurality of tension devices includes a plurality of piston/cylinder devices, the portion of the load weight being in proportion with the load weight when the load weight is less than a predetermined threshold; and a manifold interconnecting the plurality of piston/cylinder devices in fluid communication with each other.

13. The dynamic load-sharing system of claim 12, wherein the portion of the load weight is at a predetermined maximum allowable limit when the load weight is greater than the predetermined threshold.

14. The dynamic load-sharing system of claim 12, further comprising a plurality of ceiling anchors at the ceiling and a plurality of floor anchors at the floor, the plurality of tension devices extend between the plurality of ceiling anchors and the plurality of floor anchors, wherein the plurality of ceiling anchors are of a first quantity, the plurality of floor anchors are of a second quantity, the plurality of tension devices are of a third quantity, the second quantity of the floor anchors is greater than the third quantity of tension devices.

\* \* \* \* \*